US011592526B2

(12) United States Patent
Ratner (10) Patent No.: US 11,592,526 B2
(45) Date of Patent: Feb. 28, 2023

(54) LIDAR SENSOR ASSEMBLY INCLUDING DOVETAIL JOINT COUPLING FEATURES

(71) Applicant: UATC, LLC, San Francisco, CA (US)

(72) Inventor: Daniel Ratner, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 646 days.

(21) Appl. No.: 15/980,669

(22) Filed: May 15, 2018

(65) Prior Publication Data

US 2019/0353756 A1 Nov. 21, 2019

(51) Int. Cl.
*G01S 7/481* (2006.01)
*G01S 17/93* (2020.01)

(52) U.S. Cl.
CPC .......... *G01S 7/4813* (2013.01); *G01S 17/93* (2013.01)

(58) Field of Classification Search
CPC ........ G01S 13/87; G01S 17/66; G01S 13/933; G01S 2007/4078; G01S 17/93; G01S 7/4813; B64D 7/06; B64D 1/02; B64D 7/08; B64D 1/04; B64D 7/00; F42B 5/155; F42B 12/70; F42B 12/48; F41F 1/08; G05D 1/0094; F41G 3/22; F41G 5/18; F41H 11/02
See application file for complete search history.

(56) References Cited

U.S. PATENT DOCUMENTS

| 5,624,266 A * | 4/1997 | Gibbs ................. H01R 13/629 224/315 |
| 8,887,975 B1 * | 11/2014 | Basile ..................... B62J 11/00 224/452 |
| 10,179,647 B1 * | 1/2019 | Meugnier ............ H05K 7/1417 |
| 10,870,401 B2 * | 12/2020 | Kataishi ................ G03B 19/07 |
| 2012/0169876 A1 * | 7/2012 | Reichert ................ G01S 17/89 348/148 |
| 2017/0108759 A1 * | 4/2017 | Clearman ............ G03B 17/561 |
| 2018/0015886 A1 * | 1/2018 | Frank ..................... B62D 25/06 |
| 2019/0137220 A1 * | 5/2019 | Zaetterqvist ............. B64D 7/06 |
| 2019/0193857 A1 * | 6/2019 | Zätterqvist ............. F41H 11/02 |

FOREIGN PATENT DOCUMENTS

| DE | 102012101781 | 9/2013 |
| DE | 102016010825 | 3/2017 |
| EP | 1762860 | 3/2007 |
| WO | WO 2011/022741 | 3/2011 |

OTHER PUBLICATIONS

International Search Report and Written Opinion for PCT/US2019/032456, dated Aug. 6, 2019, 12 pages.
International Preliminary Report on Patentability for Application No. PCT/US2019/032456, dated Nov. 26, 2020, 8 pages.

\* cited by examiner

*Primary Examiner* — Luke D Ratcliffe
(74) *Attorney, Agent, or Firm* — Dority & Manning, P.A.

(57) ABSTRACT

A light detection and ranging (LIDAR) sensor assembly can comprise an optics assembly that includes a LIDAR sensor and a set of dovetail joint inserts. The LIDAR sensor assembly can further include a frame comprising a set of dovetail joint septums coupled to the set of dovetail joint inserts of the optics assembly.

17 Claims, 6 Drawing Sheets

*PRIOR ART*

*PRIOR ART*

PRIOR ART

LIDAR SENSOR ASSEMBLY INCLUDING DOVETAIL JOINT COUPLING FEATURES

BACKGROUND

Light detection and ranging (LIDAR) sensors can experience relatively high forces due to fast spinning components and movement of a vehicle upon which the LIDAR sensor is mounted. The optics assembly of a LIDAR sensor is typically held in place using clips and screws that connect with holes or slots on an optical frame.

BRIEF DESCRIPTION OF THE DRAWINGS

The disclosure herein is illustrated by way of example, and not by way of limitation, in the figures of the accompanying drawings in which like reference numerals refer to similar elements, and in which.

SUMMARY OF THE DISCLOSURE

LIDAR sensors are increasingly being used on vehicles such as airplanes, ships, boats, and automobiles for surveying or real-time three-dimensional mapping of a surrounding environment of the vehicle. A LIDAR sensor instrument principally consists of a set of lasers and a set of corresponding photodetectors that detect return signals from the pulsed laser output of the set of lasers. Autonomous vehicles (AVs) in particular employ an arrangement of sensors that collectively provide a live sensor view of the surrounding environment of the AV. AVs can employ a set of LIDAR sensors that collectively generate a live, three-dimensional point cloud mapping of the AV's surrounding environment. In certain implementations, AVs can perform simultaneous localization and mapping using the live point cloud generate by the set of LIDAR sensors mounted to the AV. LIDAR data quality and granularity depends on precision calibration of the lasers and photodetectors, as well as the stability and secureness of LIDAR components.

Figure 1A:
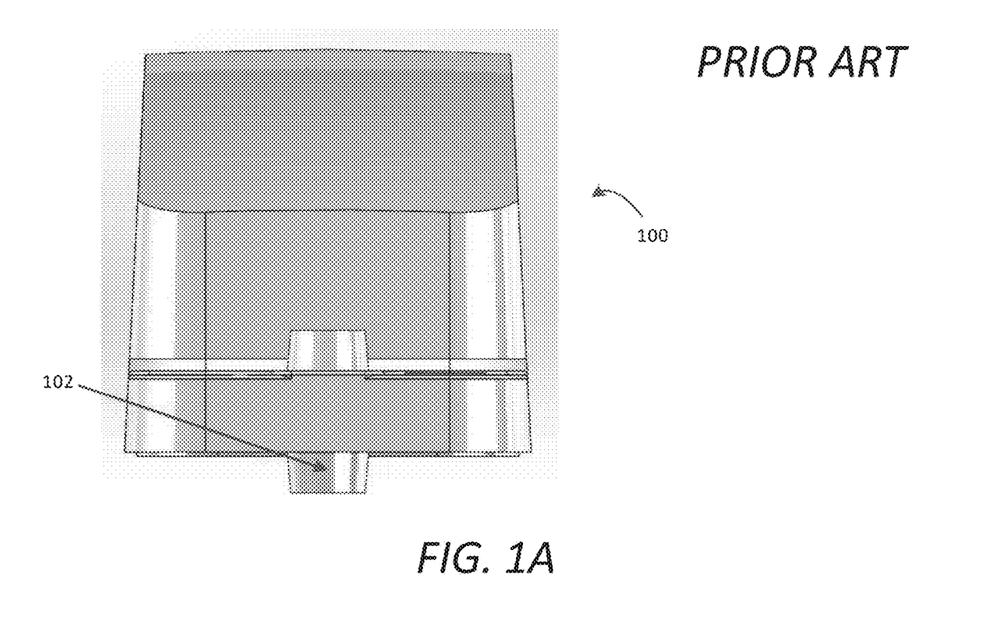
FIG. 1A is a prior art representation of an optics assembly of a LIDAR sensor including a boss protrusion.
Figure 1B:
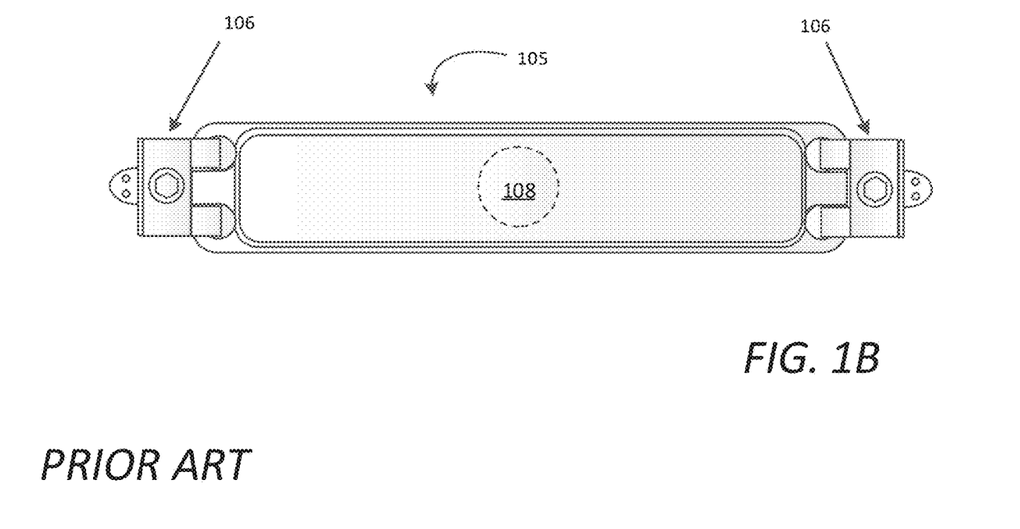
FIG. 1B is a bottom view of a prior art representation of a LIDAR sensor mount comprising mounting clips, fasteners, and a mating boss insert for the boss protrusion of the prior art optics assembly of FIG. 1A.
Figure 1C:
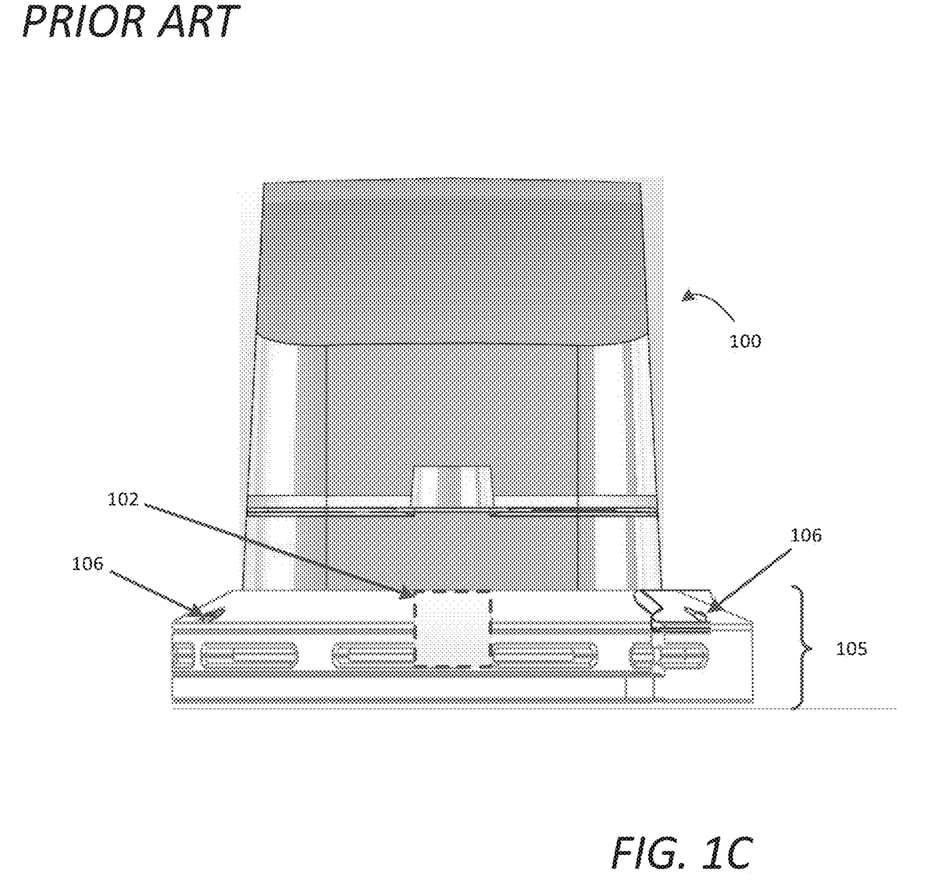
FIG. 1C is a side lateral view of a prior art representation of an optics assembly mounted to a LIDAR sensor mount with corresponding boss protrusion and insert features and mounting fasteners.

FIG. 1A shows a prior art representation of an optics assembly 100 of a LIDAR sensor including a boss protrusion 102. FIG. 1B is a bottom view of a prior art representation of a LIDAR sensor mount 105 comprising mounting clips or brackets and fasteners 106, and a mating boss insert 108 for the boss protrusion of the prior art optics assembly of FIG. 1A. FIG. 1C is a side lateral view of a prior art representation of an optics assembly 100 mounted to a LIDAR sensor mount 105 with corresponding boss protrusion and insert features 102 and mounting fasteners 106. Experienced disadvantages with such an arrangement include early wear in the mounting fasteners and clips 106 which can act as weak points for the overall system. Accordingly, failure or excessive wear of the mounting brackets or clips can result over time due to the forces of the spinning LIDAR sensor within the optics assembly 100, as well as bouncing and jolting from the vehicle onto which the LIDAR sensor mounted is attached.

To overcome the deficiencies of the prior art embodiments, examples described herein include an optics assembly of a LIDAR sensor. The LIDAR sensor can comprise a set of lasers and a set of photodetectors disposed within the optics assembly. The optics assembly can include at least one lens and dovetail joint features that couple the optics assembly to corresponding dovetail joint septums on a LIDAR sensor mount. The dovetail joint can be configured to securely fasten the optics assembly to the LIDAR sensor mount. In various aspects, the dovetail joint configuration for the optics assembly can eliminate the need for boss protrusions, screws, screw holes, clips, brackets, and the like. As described, stresses due to the high-spinning LIDAR sensor within the optics assembly and forces from normal vehicle operation can result in fatigue in such components, which can result in costly failures, repairs, or misalignment. The dovetail joint configuration described herein provides for a more robust fastening means, resulting in increased stability and more secure and reliable alignment and orientation.

In certain implementations, the LIDAR sensor frame can comprise at least one dovetailed septum to which the dovetail inserts of the optics assembly of the LIDAR sensor may be joined. In certain aspects, the mounting septum can further comprise a locking means (e.g., a spring and pin) that forces the optics assembly into a settled position when coupled to the LIDAR sensor frame. In certain examples, the locking means for securing the optics assembly to the LIDAR sensor frame can be a characteristic of the shape of the dovetail joint, in which the dovetailed mounting septum comprises a partial convex or irregular polygonal or quadrilateral shape, such as that of a partial acute or isosceles trapezoid.

In certain implementations, the LIDAR sensor frame can include multiple dovetailed septa upon which multiple LIDAR sensor optics assemblies can be joined. In such examples, between each LIDAR sensor, the sensor mount can comprise a dual dovetail septum that joins corresponding dovetail inserts of a pair of optics assemblies of LIDAR sensors, providing for the ability to mount multiple LIDAR sensors using a single frame.

DETAILED DESCRIPTION

Reference is made herein to detailed embodiments, one or more examples of which are illustrated in the drawings. Each example is provided by way of explanation of the embodiments, and not in limitation of the present disclosure. It will be apparent to those skilled in the art that various modifications and variations can be made to the embodiments without departing from the scope of the present disclosure. For instance, features illustrated or described as part of one embodiment can be used with another embodiment to yield a still further embodiment. Accordingly, it is intended that aspects of the present disclosure made for illustrative purposes cover such modifications and variations.

Lidar Sensor Frame

Figure 2A:
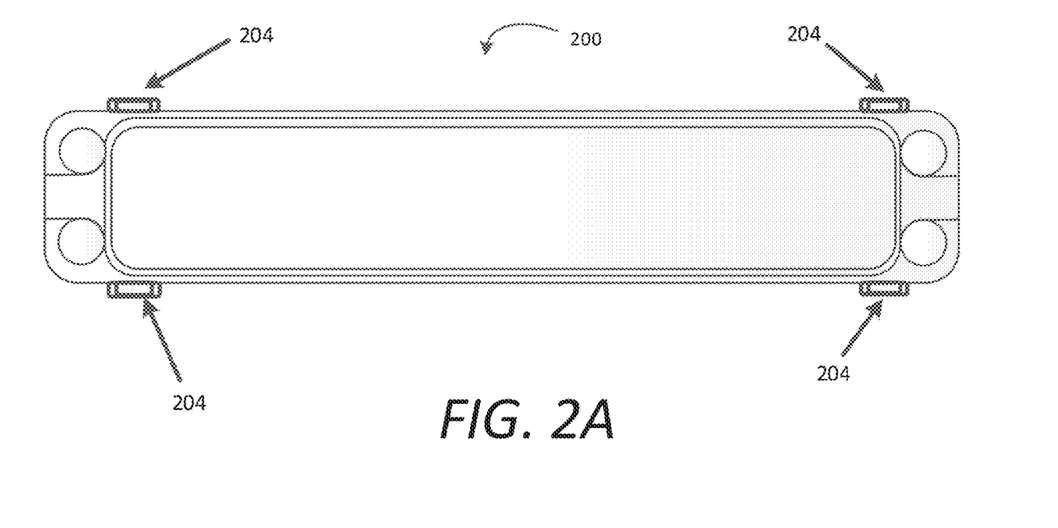
FIG. 2A is bottom view of a LIDAR sensor mount comprising dovetail inserts for coupling to an optics assembly of a LIDAR sensor, according to examples described herein.

FIG. 2A is bottom view of a LIDAR sensor frame 200 comprising dovetail joint mounting septa 204 for coupling to an optics assembly of a LIDAR sensor, according to examples described herein. The dovetail joint septa 204 can be configured to replace conventional clips and fasteners (e.g., screws, pins, and holes) utilized for mounting LIDAR sensors. Furthermore, the utilization of dovetail joint features described herein eliminates the need for a boss protrusion insert, such as the insert 108 configured with the LIDAR chassis 105 shown in FIG. 1B.

Figure 2B:
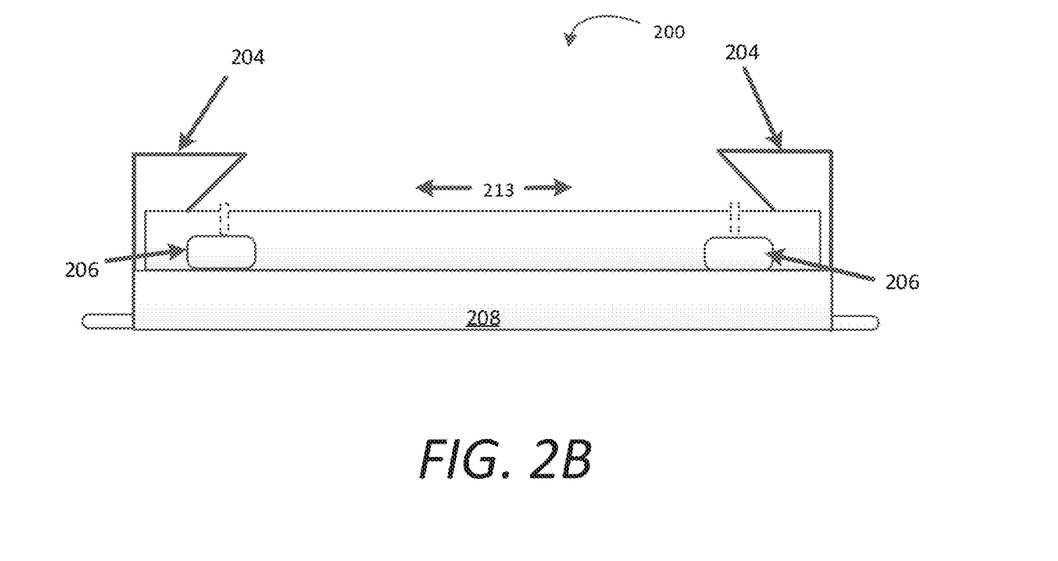
FIG. 2B is a side lateral view of a LIDAR sensor mount comprising dovetail inserts for coupling to an optics assembly of a LIDAR sensor, according to examples described herein.

FIG. 2B is a side lateral view of a LIDAR sensor frame 200 comprising dovetail inserts 204 for coupling to an optics assembly of a LIDAR sensor, according to examples described herein. The LIDAR sensor frame 200 can comprise a chassis or supporting mount for a LIDAR sensor, and can be mounted to a vehicle, such as an airplane or autonomous vehicle. As shown in FIG. 2B, a dovetail joint septum 204 can comprise a partial convex or irregular polygonal or quadrilateral shape that, when mated with a corresponding dovetail joint insert of an optics assembly of a LIDAR sensor, can securely fasten the LIDAR sensor to the sensor frame 200. As further shown in FIG. 2B, the sensor frame 200 can include multiple dovetail joint septums 204 (or septa) each of which can secure a corresponding insert of the LIDAR sensor optics assembly.

In certain examples, the sensor frame 200 can further include one or more locking means 206, such as spring-loaded locking pins, which can be automatically or manually triggered to lock the dovetail joint inserts of the LIDAR sensor optics assembly to the sensor frame 200. For example, the locking means 206 can include a locking pin configured to engage a locking cavity of the optics assembly 300. In certain examples, a locking cavity can be formed into the dovetail joint insert 304 of the optics assembly 300. In variations, the locking cavity can be formed in a base of the optics assembly 300. Once engaged, the locking means 206 can prevent the LIDAR sensor from lateral or transverse movement caused by the vehicle's movement over uneven surfaces or during acceleration and deceleration, and/or the spinning LIDAR sensor within the optics assembly. In some aspects, each of the locking means 206 can comprise combination of locking features (e.g., a spring, screw lock, dowel pin, etc.). In certain variations, the locking means 206 can be configured at an angle to prevent movement along every axis of the LIDAR sensor.

In various aspects, between the dovetail septums 204, the sensor frame 200 can include a mounting recess 213 into which the base of the optics assembly of the LIDAR sensor can rest. The recess 213 can be substantially the same width as the optics assembly of the LIDAR sensor to provide a secure fit for the LIDAR sensor. According to examples described herein, the base of the optics assembly of the LIDAR sensor can slide or twist into place within the recess 213 until the dovetail inserts of the optics assembly as secured to the dovetail septums 204 of the sensor frame 200. In some examples, when the dovetail inserts of the optics assembly are aligned with the dovetail septums 204, the locking means 206 can be engaged, either automatically or manually by a technician.

In certain implementations, the sensor frame 200 can be affixed to a larger sensor array mount of a vehicle, or to the vehicle itself. For example, the base 208 of the senor frame 200 can include brackets or fasteners that enable the sensor frame 200 to be bolted to the vehicle. In some aspects, the sensor frame 200 can be coupled to a vehicle by way of welds or can be formed with the bodywork of the vehicle.

Lidar Optics Assembly

Figure 3:
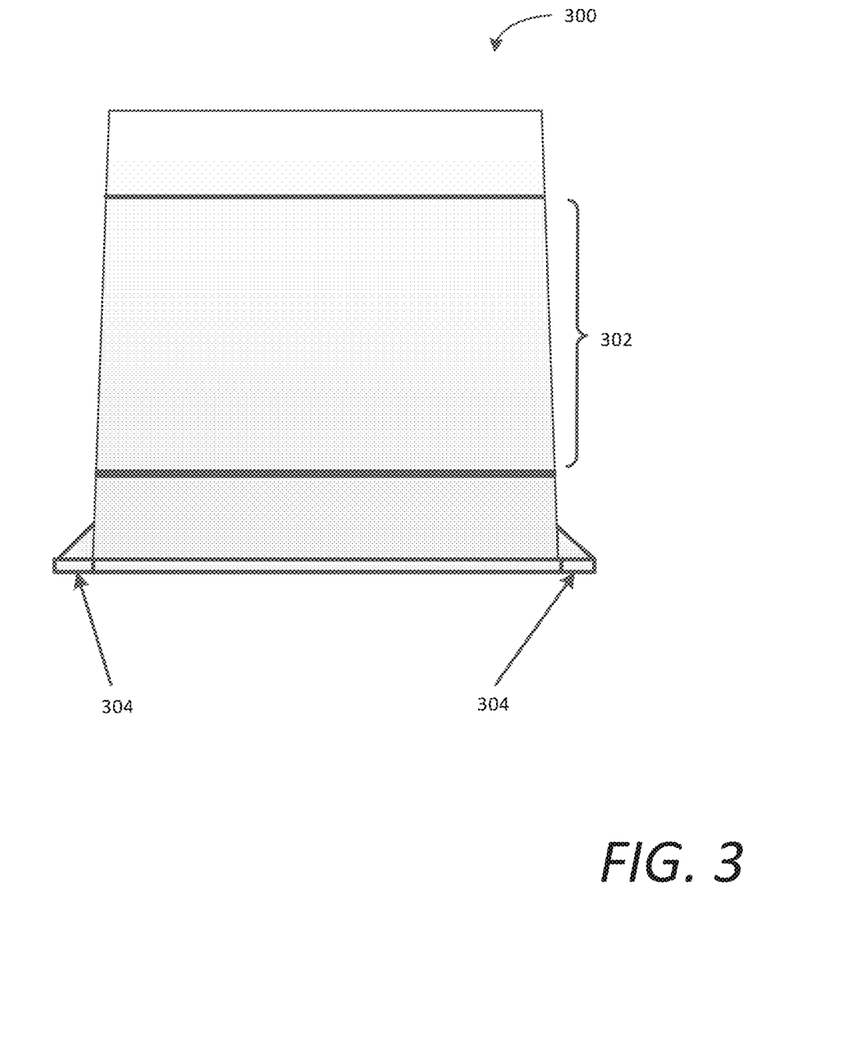
FIG. 3 illustrates an optics assembly of a LIDAR sensor comprising dovetail joint inserts for coupling the optics assembly to corresponding dovetail septums of a LIDAR sensor mount, according to examples described herein.

FIG. 3 illustrates an LIDAR optics assembly 300 of a LIDAR sensor comprising dovetail joint inserts 304 for coupling the optics assembly 300 to corresponding dovetail septums of a LIDAR sensor frame, according to examples described herein. In various implementations, the optics assembly 300 can include a lens 302 through which laser light can be emitted and return signals can be detected by photodetectors of the LIDAR sensor disposed within. In certain examples, the lens 302 and the optics assembly 300 can comprise a substantially cylindrical shape, or partially conical shape, and the lens 302 can be formed to encompass the entire circumference of the optics assembly 300. The lens 302 can also have a height that is a fraction of the height of the optics assembly 300, as shown in FIG. 3.

With further reference to FIG. 3, the optics assembly 300 can include a set of dovetail joint inserts 304 configured to couple with a corresponding set of dovetail joint septums 204 and/or locking means 206 of a LIDAR sensor frame 200. In certain examples, the dovetail joint inserts 304 can comprise a protruding feature of the optics assembly 300 having a shape that is substantially triangular, or an irregular polygonal shape, and that corresponds as a mating feature of the dovetail joint septums 204 of the LIDAR sensor frame 200. It is contemplated that the inserts 304 and the corresponding septums 204 of the sensor frame 200 can comprise any suitable shape and can be formed on a perimeter of the optics assembly 300. It is further contemplated that such dovetail joint inserts 304 can replace screw holes, fastening brackets or clips, and/or boss protrusions of conventional LIDAR sensors.

In certain implementations, the dovetail joint inserts 304 can be formed with the optics assembly 300 during manufacturing. For example, when a housing portion of the optics assembly 300 (e.g., the optics assembly minus the lens) is molded or otherwise manufactured, the dovetail inserts 304 can be formed to the optics assembly 300. In variations, the dovetail inserts 304 can be coupled to the optics assembly 300 as a fashioned component post-manufacture. For example, the dovetail inserts 304 can be manufactured separately from the optics assembly 300 and can be mounted to the optics assembly 300 using a set of fastening means.

Lidar Sensor Assembly

Figure 4:
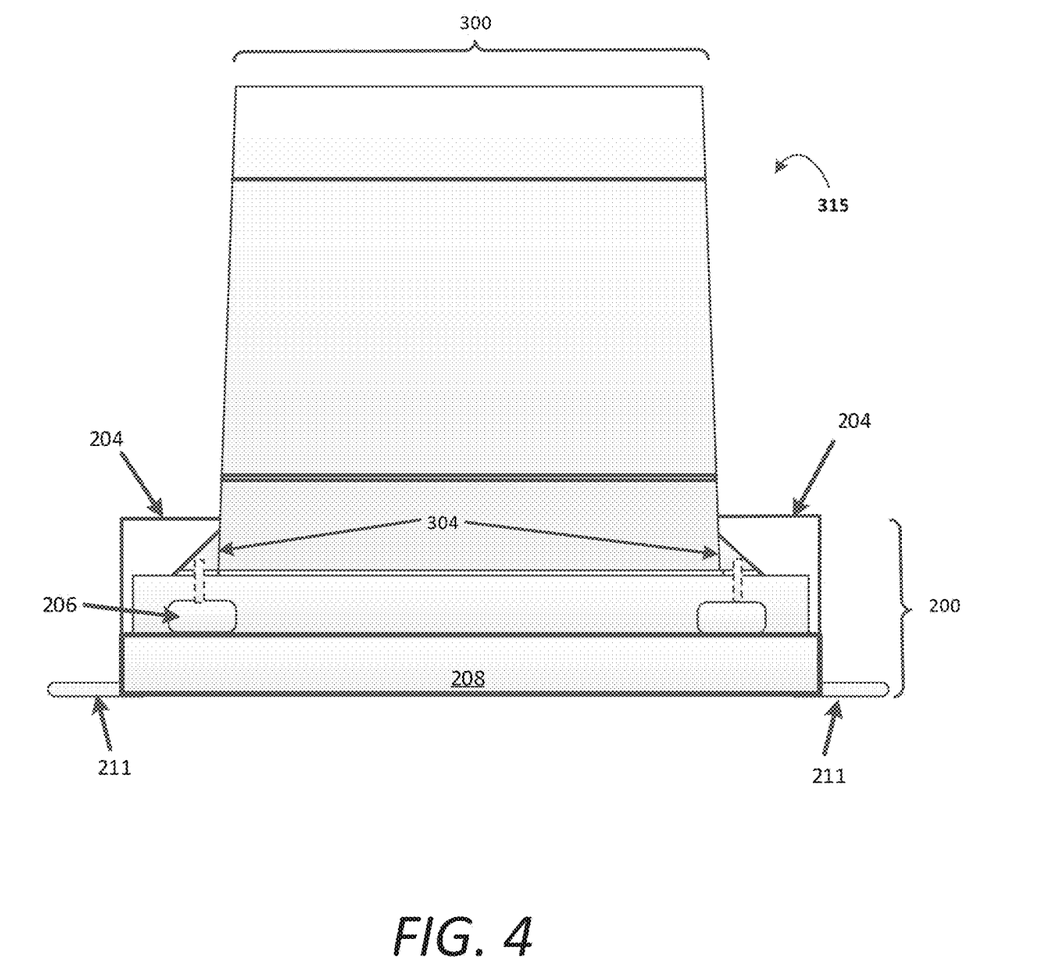
FIG. 4 illustrates a LIDAR sensor assembly including an optics assembly coupled to a LIDAR sensor frame using dovetail joint coupling features, according to various examples.

FIG. 4 illustrates a LIDAR sensor assembly 315 including an optics assembly 300 coupled to a LIDAR sensor frame 200 using dovetail joint coupling features, according to various examples. Accordingly to various examples, the LIDAR sensor assembly 315 comprises an optics assembly 300 with a LIDAR sensor disposed therein, and a LIDAR sensor frame 200, such as the frame 200 described with respect to FIGS. 2A and 2B. With reference to FIG. 4, the optics assembly 300 is fastened to the LIDAR sensor frame 200 via a dovetail joint. For example, the dovetail inserts 304 of the optics assembly 300 are mated with the corresponding dovetail septums 204 of the LIDAR sensor frame 200 such that the optics assembly 300 is secured to the sensor frame 200.

In certain examples, the locking means 206 can be engaged with the optics assembly 300 or the dovetail inserts 304 of the optics assembly 300 once coupled. For example, the locking means 206 can comprise dowels or pins fused or coupled to pre-loaded springs that, when aligned with corresponding mating cavities of the optics assembly 300, engage to lock the optics assembly 300 in place. In some examples, the optics assembly 300 can be twisted into the sensor frame 200 until the dowels or pins of the locking means 206 align with the mating cavities of the dovetail inserts 304 of the optics assembly 300. As described, once the dowels or pins of the locking means 206 are aligned with the mating cavities of the dovetail inserts 304, the locking means 206 can engage the inserts 206 to lock the optics assembly 300 in place.

In certain aspects, the dovetail inserts 304 and/or the dovetail septums 204 can include one or more gaskets or protective lining to seal the optics assembly 300 to the LIDAR sensor frame 200. In such aspects, the gasket(s) or lining can further provide cushioning for the LIDAR sensor and optics assembly 300 against harsh forces and jolts. In variations, the base of the optics assembly 300 or a coupling platform of the LIDAR sensor frame 200 can include seals or gaskets to aid in affixing the optics assembly 300 to the sensor frame 200.

In various examples, the base 208 of the LIDAR sensor frame 200 can include a set of mounting features 211, such as mounting brackets that can enable the sensor frame 200 to be coupled to a vehicle. For example, the mounting features 211 can enable the sensor frame 200 to be bolted or welded onto the bodywork or a larger sensor array frame on the vehicle (e.g., the roof of the vehicle).

Figure 5:
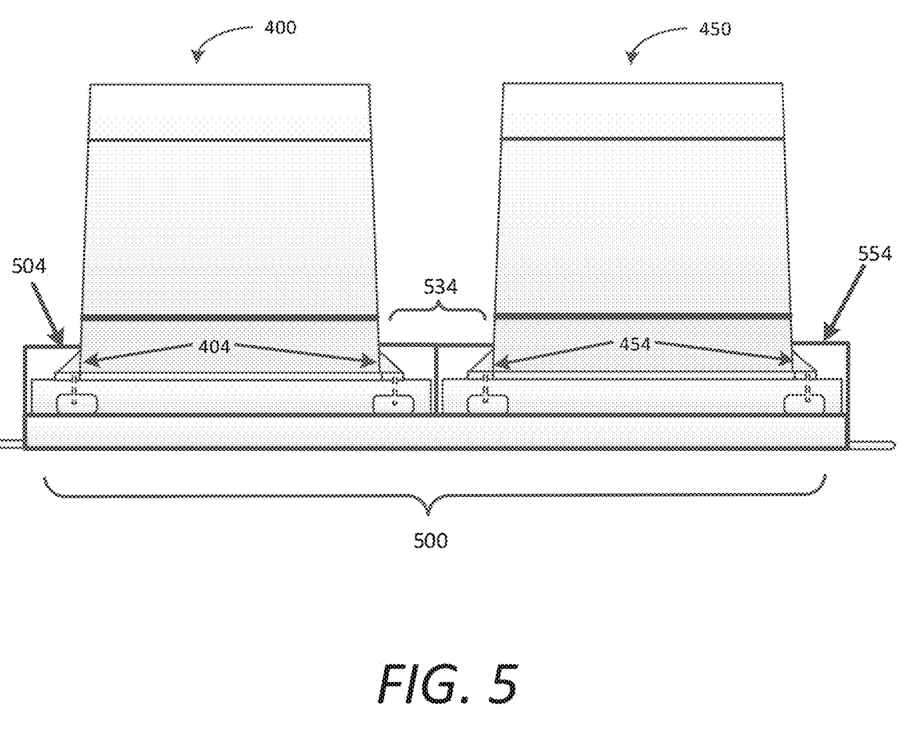
FIG. 5 illustrates a combination of LIDAR sensor optical assemblies coupled to a multi-sensor mount via a set of dovetail joints, according to various examples described herein.

FIG. 5 illustrates a LIDAR sensor assembly comprising a combination of LIDAR sensor optical assemblies 400, 450 coupled to a multi-sensor mount 500 via a set of dovetail joints, according to various examples described herein. In the example shown in FIG. 5, the multi-sensor mount or frame 500 dual dovetail septum 534 that joins corresponding dovetail inserts of a pair of optics assemblies 400, 450 of LIDAR sensors, providing for the ability to mount multiple LIDAR sensors using a single frame. In various aspects, the sensor mount 500 can include a proximal dovetail septum 504 and a distal dovetail septum 554, with the dual dovetail septum 534 therebetween. The combination can include a first LIDAR sensor optics assembly 400 including a first set of dovetail inserts 404, and a second LIDAR sensor optics assembly 450 with a second set of dovetail inserts 454. The first set of inserts 404 and second set of inserts 454 can be coupled to the corresponding dovetail septums 504, 534, 554 of the multi-sensor mount 500.

Specifically, the proximal dovetail septum 504 can be joined with a first dovetail insert 404 of the first optics assembly 400, with the other dovetail insert being joined to the dual dovetail septum 534. The dual dovetail septum 534 can further be joined to a first dovetail insert 454 of the second LIDAR sensor optics assembly 450. The distal dovetail septum 554 of the multi-sensor mount 500 can be joined to the other dovetail insert 454 of the second optics assembly 450.

A LIDAR sensor can be disposed within each of the optics assemblies 400, 450. Further, each optics assembly 400, 450 can include a respective lens through which pulsed laser light is outputted and return signals are detected. In certain examples, each of the optics assemblies 400, 450 can be locked and secured into place via a set of locking means, as described herein.

Described throughout the present disclosure are example LIDAR sensor mounts and optics assemblies featuring dovetail joints to secure LIDAR sensors and provide robustness against the stresses of the operating vehicle upon which the sensors are mounted, and the high-frequency, spinning LIDAR sensor within the optics assemblies. Embodiments described herein can act to secure LIDAR components as well as support alignment of critical features of the LIDAR sensor, such as internal lenses (e.g., a transmit lens throughout which laser pulses are outputted and a receive lens through which target return signals are detected). The dovetail joint embodiments described herein can further support parallelism between the transmit and receive lenses of the LIDAR sensors within the optics assemblies.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A LIDAR sensor assembly comprising:
a multi-sensor frame comprising a set of dovetail joint septums and a dual dovetail joint septum; and
a plurality of assemblies, wherein a first assembly of the plurality of assemblies comprising a spinning LIDAR sensor and a first set of dovetail joint inserts and a second assembly of the plurality of assemblies comprising a sensor and a second set of dovetail joint inserts;
wherein the set of dovetail joint septums and the dual dovetail joint septum are coupled to the first set of dovetail joint inserts of the first assembly of the plurality of assemblies and the second set of dovetail joint inserts of the second assembly of the plurality of assemblies,
wherein the set of dovetail joint septums and the dual dovetail joint septum comprises a proximal dovetail joint septum and a distal dovetail joint septum with the dual dovetail joint septum therebetween,
wherein the first assembly is mounted between the proximal dovetail joint septum and a first side of the dual dovetail joint septum, and
wherein the second assembly is mounted between a second side of the dual dovetail joint septum and the distal dovetail joint septum.

2. The LIDAR sensor assembly of claim 1, wherein the first assembly is configured to twist or slide in a mounting recess of the multi-sensor frame to align the first set of dovetail joint inserts of the first assembly with the proximal dovetail joint septum and the first side of the dual dovetail joint septum.

3. The LIDAR sensor assembly of claim 1, wherein the multi-sensor frame further comprises a set of mounting features to enable the multi-sensor frame to be mounted to a vehicle.

4. The LIDAR sensor assembly of claim 1, wherein the first set of dovetail joint inserts comprises a first pair of dovetail joint inserts formed on a perimeter of the first assembly.

5. The LIDAR sensor assembly of claim 1, wherein the multi-sensor frame further comprises a set of locking means securely fastening the first assembly to the multi-sensor frame when the first set of dovetail joint inserts and the proximal dovetail joint septum and the first side of the dual dovetail joint septum are aligned.

6. The LIDAR sensor assembly of claim 5, wherein at least one locking means of the set of locking means comprises a locking pin that engages a locking cavity of the first assembly.

7. The LIDAR sensor assembly of claim 6, wherein the locking cavity of the first assembly is positioned within a dovetail joint insert of the first set of dovetail joint inserts.

8. The LIDAR sensor assembly of claim 5, wherein the set of locking means automatically engage with the first assembly when the first set of dovetail joint inserts and the proximal dovetail joint septum and the first side of the dual dovetail joint septum are aligned.

9. The LIDAR sensor assembly of claim 1, wherein the second assembly is configured to twist or slide in a recess of the multi-sensor frame to align the first set of dovetail joint inserts of the first assembly with the proximal dovetail joint septum and the first side of the dual dovetail joint septum.

10. The LIDAR sensor assembly of claim 1, wherein the multi-sensor frame further comprises a set of mounting features to enable the multi-sensor frame to be mounted to a vehicle.

11. The LIDAR sensor assembly of claim 1, wherein the multi-sensor frame further comprises a set of locking means securely fastening the first assembly to the multi-sensor frame when the first set of dovetail joint inserts are aligned with the proximal dovetail joint septum and the first side of the dual dovetail joint septum.

12. A LIDAR sensor frame comprising:
a set of dovetail joint septums and a dual dovetail joint septum coupled to a first set of dovetail joint inserts of a first assembly of a spinning LIDAR sensor to secure the first assembly in lateral and transverse directions against forces from the spinning LIDAR sensor within the first assembly and a mounting recess between a proximal dovetail joint septum of the set of dovetail joint septums and a first side of the dual dovetail joint septum and a second set of dovetail joint inserts for a second assembly.

13. The LIDAR sensor frame of claim 12, wherein the first assembly is configured to twist or slide in the mounting recess of the LIDAR sensor frame to align the first set of dovetail joint inserts of the first assembly with the proximal dovetail joint septum and the first side of the dual dovetail joint septum of the LIDAR sensor frame.

14. The LIDAR sensor frame of claim 12, further comprising:
a set of mounting features to enable the LIDAR sensor frame to be mounted to a vehicle.

15. The LIDAR sensor frame of claim 12, further comprising:
a set of locking means securely fastening the LIDAR sensor frame to the first assembly when the first set of dovetail joint inserts and the proximal dovetail joint septum and the first side of the dual dovetail joint septum are aligned.

16. The LIDAR sensor frame of claim 15, wherein at least one locking means of the set of locking means comprises a locking pin that engages a locking cavity of the first assembly.

17. The LIDAR sensor frame of claim 16, wherein the locking cavity of the first assembly is positioned within a dovetail joint insert of the first set of dovetail joint inserts.

* * * * *